United States Patent
Mohr et al.

(10) Patent No.: US 11,481,305 B2
(45) Date of Patent: Oct. 25, 2022

(54) METHOD AND APPARATUS FOR DETECTING A MONITORING GAP FOR AN INFORMATION HANDLING SYSTEM

(71) Applicant: DELL PRODUCTS, LP, Round Rock, TX (US)

(72) Inventors: Rodrigo Mohr, Porto Alegre (BR); Rafael Mohr, Porto Alegre (BR); Douglas Torgo Fabretti, Florianópolis (BR); Mauricio Rissi, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 486 days.

(21) Appl. No.: 16/728,603

(22) Filed: Dec. 27, 2019

(65) Prior Publication Data

US 2021/0200658 A1    Jul. 1, 2021

(51) Int. Cl.
*G06F 11/34*       (2006.01)
*G06F 11/30*       (2006.01)
*G06N 5/04*        (2006.01)
*G06N 20/00*       (2019.01)

(52) U.S. Cl.
CPC ...... *G06F 11/3442* (2013.01); *G06F 11/3034* (2013.01); *G06N 5/04* (2013.01); *G06N 20/00* (2019.01)

(58) Field of Classification Search
CPC ... G06F 11/3442; G06F 11/3034; G06N 5/04; G06N 20/00
See application file for complete search history.

(56) References Cited

U.S. PATENT DOCUMENTS

| | | | |
|---|---|---|---|
| 9,800,489 B1 * | 10/2017 | Polyanskiy | H04L 43/20 |
| 10,078,571 B2 * | 9/2018 | Altman | G06F 11/3495 |
| 10,805,195 B2 * | 10/2020 | Caputo, II | H04L 41/0823 |
| 11,029,972 B2 * | 6/2021 | Vichare | G06F 11/3466 |
| 11,354,216 B2 * | 6/2022 | Gardner | G06F 11/3006 |
| 2005/0182582 A1 * | 8/2005 | Chen | G06F 11/3495 |
| | | | 702/108 |
| 2016/0050102 A1 | 2/2016 | Natarajan et al. | |
| 2019/0057006 A1 * | 2/2019 | Boyapalle | G06F 11/3452 |
| 2019/0102204 A1 | 4/2019 | Khosrowpour et al. | |

* cited by examiner

*Primary Examiner* — Henry Tsai
*Assistant Examiner* — Christopher A Daley
(74) *Attorney, Agent, or Firm* — Larson Newman, LLP

(57) ABSTRACT

An information handling system includes an analysis block configured to obtain monitoring results from a monitoring data repository, to analyze the monitoring results to identify at least one monitoring gap, and to provide a monitoring gap result identifying the at least one monitoring gap. A machine learning recommender produces a recommendation to reduce the monitoring gap, and a user interface displays the recommendation.

20 Claims, 3 Drawing Sheets

METHOD AND APPARATUS FOR DETECTING A MONITORING GAP FOR AN INFORMATION HANDLING SYSTEM

FIELD OF THE DISCLOSURE

The present disclosure generally relates to information handling systems, and more particularly relates to detecting a monitoring gap for an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An analysis block may obtain monitoring results from a monitoring data repository, analyze the monitoring results to identify at least one monitoring gap, and provide a monitoring gap result identifying the at least one monitoring gap. A machine learning recommender produces a recommendation to reduce the monitoring gap, and a user interface displays the recommendation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
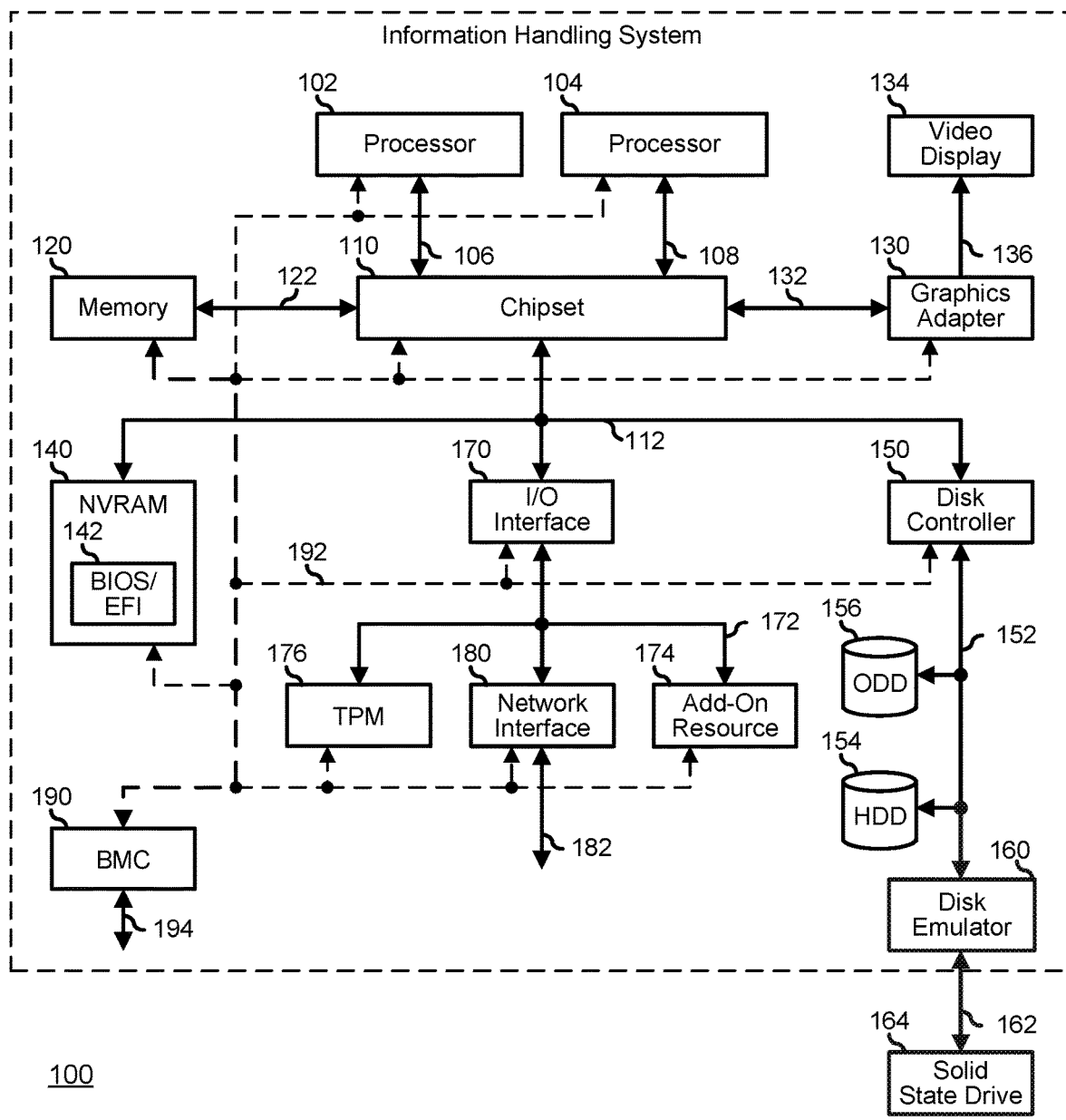
FIG. 1 is a block diagram illustrating an information handling system according to an embodiment of the present disclosure.

FIG. 1 illustrates a generalized embodiment of information handling system 100 that includes processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniB and channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external information handling system (IHS).

IHSs are relied upon to perform many functions, and monitoring tools have been developed to help assure proper operation of IHSs. A monitoring tool such as Foglight can be used to monitor Structured Query Language (SQL) databases. Examples of monitoring that Foglight can provide for selected SQL servers include deadlocks, transactions per second, and custom queries. Monitoring tool Oracle Enterprise Manager (OEM) can be used to monitor Oracle databases. Examples of monitoring that OEM can provide include deadlocks, transactions per second, and custom queries. Monitoring tool OpenManage Essentials (OME) can be used to monitor physical servers, including the hardware elements of which a physical server comprises. Examples of monitoring that OME can provide include hard drive health, memory failures, and CPU temperature. Monitoring tool Splunk can be used to monitor selected servers and virtual machines to provide log analytics. Examples of monitoring that Splunk can provide include log entries comprising a particular string and numbers of transactions.

Monitoring tool Riverbed can be used to perform application profiling. Examples of application profiling that Riverbed can provide for selected application servers include monitoring of error rates and speed and performing a stack trace of calls. Monitoring tool System Center Operations Manager (SCOM) can be used to monitor Microsoft applications. Examples of monitoring that SCOM can provide for applications such as Exchange, Active Directory, and SharePoint include custom transactions for each application. Monitoring tool Zabbix can be used to monitor an operating system (OS) upon which applications are executed within an information handling system, which may, for example, be a server or a virtual machine. Examples of monitoring that Zabbix can provide for servers and virtual machines include CPU/Memory usage, URL health, and service status.

Monitoring tools can monitor at least one IHS, such as at least one server, to alert an information technology (IT) operations (ITOPS) entity when problems are detected. As one example, a monitoring tool can provide baseline monitoring, whereby generic monitors can be applied for all servers under same technology. For example, central processing unit (CPU) usage, memory usage, or both can be monitored using baseline monitoring. As another example, a monitoring tool can provide custom monitoring, whereby the monitoring can be specific for each application.

Heretofore, there has been a lack of visibility to understand which monitoring tools are in place on one or more IHSs. Monitoring gaps have gone undetected. Questions have existed as to whether baseline monitors are working, whether an entire application is covered, whether dependencies are monitored, and so on.

While each monitoring tool provides its respective monitoring capability, there has been no assurance that the aggregation of those monitoring capabilities provides complete monitoring without gaps in the monitoring. Monitoring gaps can exist at different levels and in different contexts within an IHS. Historically, many problems with IHSs have not been detected by existing monitoring tools. Thus, finding such gaps has been an elusive technical challenge that has not heretofore been adequately addressed.

Figure 2:
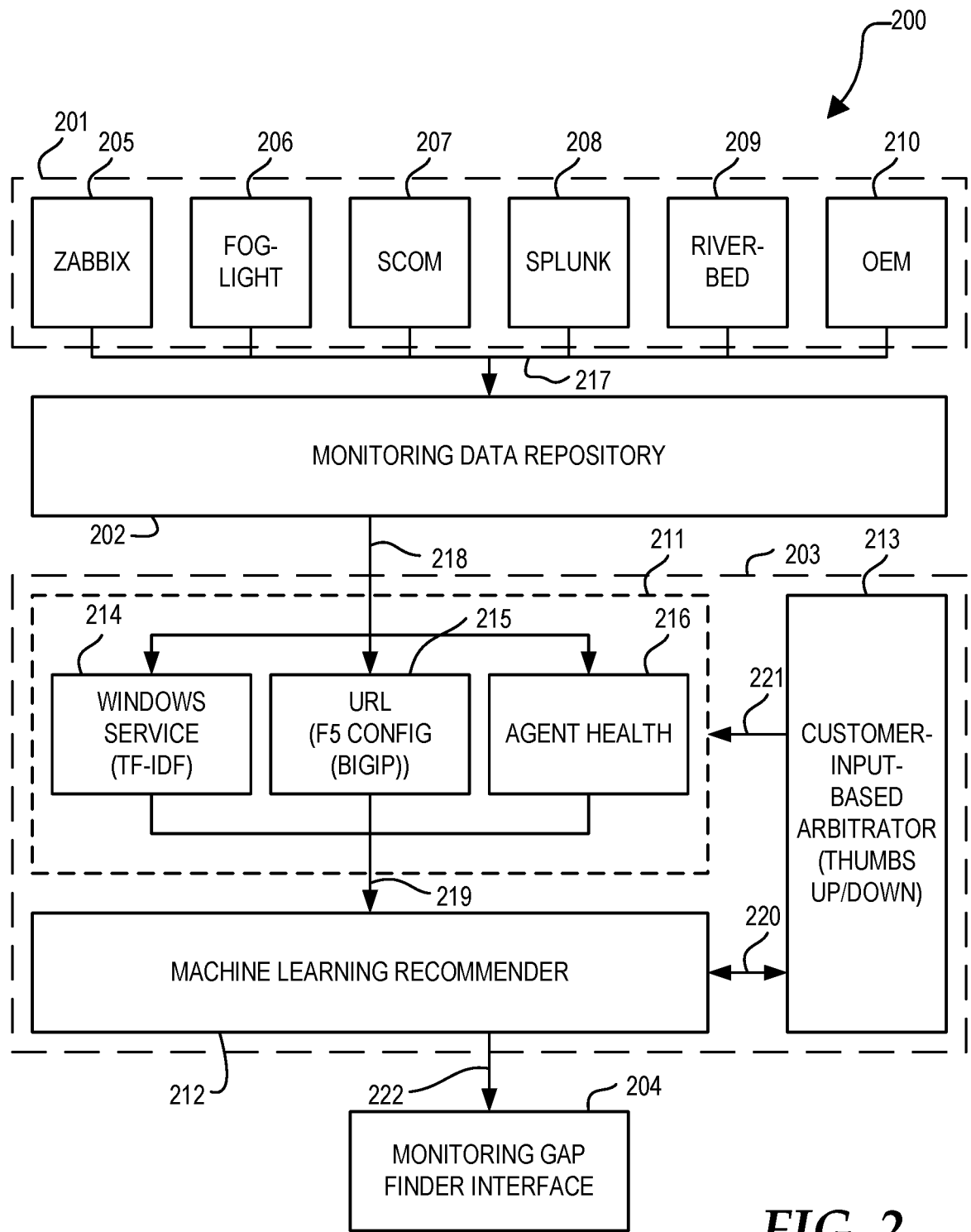
FIG. 2 is a block diagram illustrating an apparatus for detecting a monitoring gap for an information handling system according to an embodiment of the present disclosure.

FIG. 2 shows an apparatus for detecting a monitoring gap for an information handling system according to an embodiment of the present disclosure. Apparatus 200 includes a plurality of monitoring tools 201, a monitoring data repository 202, a monitoring gap detection subsystem 203, and a monitoring gap finder interface 204. Apparatus 200 can be implemented, for example, in an IHS, such as the IHS illustrated in FIG. 1. Monitoring tools 201 monitor a subject information handling system and provide their monitoring results to monitoring data repository (MDR) 202 via path 217.

Monitoring tools 201 include a plurality of individual monitoring tools such as a combination of some or all of an operating system (OS) or hardware monitoring tool, a database monitoring tool, and an application monitoring tool. The OS or hardware monitoring tool is exemplified by Zabbix monitoring tool 205. The database monitoring tool is exemplified by Foglight monitoring tool 206, System Center Operations Manager (SCOM) monitoring tool 207, and Oracle Enterprise Manager (OEM) monitoring tool 210. The application monitoring tool is exemplified by Splunk monitoring tool 208 and Riverbed monitoring tool 209. Another example of an OS or hardware monitoring tool is the OpenManage Enterprise (OME) monitoring tool. Another example of an application monitoring tool is the Catchpoint monitoring tool.

The above-mentioned examples and the individual monitoring tools shown in FIG. 2 are merely exemplary of the type of monitoring tools with which at least one embodiment may be practiced. Other combinations of some or all of the above examples, of some or all of the above examples combined with one or more other individual monitoring tools, or of one or more other individual monitoring tools may be used in accordance with various embodiments. MDR 202, which can alternatively be referred to as a tool data repository (TDR), is a database that consolidates monitoring results of the monitoring tools in one single entity, allowing searching of all monitoring information from a specific configuration item. For example, the monitoring results of all monitoring tools, regardless of differences that may exist between the monitoring tools, can be searched using one specific server.

Monitoring gap detection subsystem 203 comprises analysis block 211, machine learning (ML) recommender 212, and customer-input-based arbitrator 213. Analysis block 211 comprises operating system (OS) (such as Windows) service gap analyzer 214, uniform resource locator (URL) gap analyzer 215, and agent health analyzer 216. OS service gap analyzer 214, URL gap analyzer 215, and agent health analyzer 216 obtain monitoring information from monitoring data repository 202 via path 218 and provide analysis information to machine learning recommender 212 via path 219. ML recommender 212 provides a customer-reviewable recommendation output to customer-input-based arbitrator 213 via path 220. Customer-input-based arbitrator 213 obtains a customer review, such as a positive (such as thumbs up) or negative (such as thumbs down) response, from a customer. Customer-input-based arbitrator 213 can provide the customer review to, for example, analysis block 211 via path 221, ML recommender 212 via path 220, or both. The customer review can be used to perform learning within ML recommender 212, to refine the analysis of analysis block 211, or both. ML recommender 212 provides a user-interface (UI) recommendation output to monitoring gap finder interface 204 via path 222.

As an example, OS service gap analyzer 214 may be implemented using a term frequency-inverse document frequency (TF-IDF) technique. A TF-IDF technique can be implemented, for example, as a method, which can statistically determine the importance of a data element, such as a word, to an assembly of data elements, such as a document. In accordance with at least one embodiment, a TF-IDF technique can be implemented, for example, as a method, which can statistically analyze services, such as services being executed under Microsoft Windows, among a cluster of servers, such as similar servers (such as servers on which a particular application software program is being executed) and identify services which are common in the cluster and rare outside of the cluster. The monitoring tools and their efficacy in monitoring the identified services can be assessed, and monitoring gaps can be identified, with the results being provided from OS service gap analyzer 214 to ML recommender 212 via path 219.

In accordance with at least one embodiment, a TF-IDF technique can be implemented, for example, as a TF-IDF method in which a number of occurrences of each service on each server is counted, regardless of whether or not the service is one that is monitored or is one that is not monitored. As an example, the number of occurrences of each service on each server can be counted periodically (such as daily), allowing the analysis of the data to which the TF-IDF method is applied to be pre-calculated and used over a time interval. Based on the list of servers being reviewed, the dataset can be split into a number of groups (such as two groups). As an example, a first group can pertain to inside requests, which can, for example, be grouped by applications based on server list provided by a user. As an example, a second group can pertain to outside requests, which can, for example, be everything else that does not include the inside requests. In response to establishing such groupings, the rates of appearances of services in the inside clusters and the outside clusters can be calculated. As an example, a final rate can be calculated as Final_Rate=Rate_Inside*1/Rate_Outside. Whether so calculated or not, a calculation can be performed to maximize the count of occurrences inside and to minimize the count of occurrences outside. Upon calculation of the final rate, the entries in the dataset for the services can be sorted, for example, in a descending manner. The sorted services can be compared to a threshold, with those sorted services below the threshold being excluded. As an example, any entry among the sorted services lower than 75% of the final rate can be excluded. Then a check can be performed to see if any of the remaining services are monitored or not. Monitoring gaps can be identified, with the results being provided from OS service gap analyzer 214 to ML recommender 212 via path 219.

As an example, uniform resource locator (URL) gap analyzer 215 may be implemented using URL monitoring among servers in a particular cluster of servers, wherein the servers are clustered together in a pool to serve content addressed by the same one or more URLs, such as servers clustered together in a pool according to BIG-IP from F5 Networks, Inc. By providing the same URL monitoring tool at each of the servers in the same cluster, monitoring of the serving of content for a URL can be provided even when the serving of that URL can be provided by any of the plurality of servers within the cluster (such as to provide server load balancing). The monitoring tools and their efficacy in monitoring the serving of the one or more URLs can be assessed, and monitoring gaps can be identified, with the results being provided from URL gap analyzer 215 to ML recommender 212 via path 219.

To obtain information regarding one or more relevant URLs, an identical URL monitor can be installed on all servers in the same pool. All pools associated with servers can be identified from an audit. For each server, other servers in the same pools can be queried and the list of their URL monitors obtained. For each URL monitor in servers in the same pool, a check can be performed to determine whether the URL monitor exists in the original server. If not, the absence of the URL monitor in the original server can be identified as a monitoring gap.

As an example, agent health analyzer 216 may be implemented using outputs obtained by agents in place on the subject one or more IHSs. As an example, agent health analyzer 216 can check monitoring data repository (MDR) 202 to determine whether an entry in MDR 202 exists for each of the hosts to be monitored with respect to agent health. If agent health analyzer 216 determines that a host to be monitored does not have an entry in MDR 202, agent health analyzer 216 can cause an entry for that host to be created in MDR 202. Agent health analyzer 216 can check MDR 202 to determine whether an entry is present for the agent for which the agent health analysis is to be performed. If an entry is not present in MDR 202 for the agent, an indication of a monitoring gap can be provided by agent health analyzer 216 to ML recommender 212 via path 219.

Agent health analyzer 216 can perform analysis to identify why the agent is missing. As an example, agent health analyzer 216 can check whether there is a configuration problem on a configuration management database (CMDB). The CMDB is a database that contains relevant information about the hardware and software components used in an organization's information technology (IT) services and the relationships between those components. For example, agent health analyzer 216 may search for missing fields in the CMDB, which could be a configuration problem that may cause an entry for the agent to be missing from MDR 202.

As another example, agent health analyzer 216 can check whether there is an installation problem preventing an entry for an agent to be missing from MDR 202. For example, if the agent has not been installed on the host for which the agent's MDR entry is missing, agent health analyzer 216 can report that installation problem as a monitoring gap to ML recommender 212 via path 219. As another example, agent health analyzer 216 can check whether an agent has been collecting data within a recent time period (such as within the last 48 hours). If no data collection from the agent can be found within the time period, agent health analyzer 216 can report the outage as a monitoring gap to ML recommender 212 via path 219.

In accordance with at least one embodiment, ML recommender 212 can selectively apply a plurality of priorities to monitoring gaps reported to it by the components of analysis block 211. As an example, ML recommender 212 can categorize monitoring gap results (such as sorted entries in the dataset for OS (such as Windows) services) from OS service gap analyzer 214 into high priority for those at greater than or equal to 90 percent in the sorted list, medium priority for those at greater than or equal to 80 percent and at less than 90 percent in the sorted list, and low priority for those at greater than or equal to 75 percent and less than 80 percent in the sorted list. As noted previously, those at less than 75 percent can be excluded as not indicating a monitoring gap. As another example, ML recommender 212 can categorize monitoring gap results from URL gap analyzer 215 according to whether or not a server pool (such as BIG-IP pool) is disabled. If the server pool is disabled, ML recommender 212 can categorize that monitoring gap result at a medium priority level. If not, ML recommender 212 can categorize that monitoring gap result at a high priority level. As a further example, ML recommender 212 can categorize monitoring gap results from agent health analyzer 216 into medium priority for agents found not to have been collecting data during a recent time period and into high priority for agents found not to exist (such as not to have been installed).

In accordance with at least one embodiment, ML recommender 212 can operate in a learning phase and can perform learning to improve its performance at gap monitoring. For URL monitors, clustering based on their server pool (such as BIG-IP pool) is performed, and a check is performed to determine whether the same monitors are applied in the other (such as all) servers from that same server pool. Log files can be analyzed and the hypertext transfer protocol (HTTP) calls being made by the application can be scrutinized, with top dependencies being identified based thereon. External dependencies can also be monitored, and any failures to satisfy those external dependencies can be identified as a monitoring gap.

When ML recommender 212 provides recommendations to customer-input-based arbitrator 213 via path 220, customer-input-based arbitrator 213 can obtain customer input, such as an affirmative customer input (such as thumbs up) or a negative customer input (such as thumbs down), which can be provided analysis block 211 via path 221 and to ML recommender 212 via path 220. ML recommender can learn from the customer input to improve its performance. Analysis block 211 can modify its analysis based on the customer input to improve its performance. As an example, if customer-input-based arbitrator 213 receives an affirmative customer input, analysis block 211, ML recommender 212, or both can adjust their operation (including, such as learning) so the detected monitoring gap to which the recommendation pertains can receive higher priority in the future. As another example, if customer-input-based arbitrator 213 receives a negative customer input, analysis block 211, ML recommender 212, or both can adjust their operation (including, such as learning) so the detected supposed monitoring gap to which recommendation pertains can, as one example, stop being reported over time (e.g., if a supposed monitoring gap is consistently being reported negatively), as, for example, it may be a unimportant (such as spurious) indication, or, as another example, have it priority reduced (e.g., if some amount of negative reporting of the supposed monitoring gap is received via customer-input-based arbitrator 213).

In accordance with at least one embodiment, ML recommender 212 can identify gaps in monitoring coverage by analyzing application usage. As its data sources, ML recommender 212 can use monitoring configuration information, application usage information, information technology (IT) enterprise architecture information (as may be provided, for example, by a Troux enterprise architecture tool), and CMDB information, the like, or combinations thereof Monitoring configuration information may be obtained from monitoring tools, such as operating system and hardware monitoring tools (such as Zabbix monitoring tool 205, SCOM monitoring tool 207, OEM monitoring tool 210, others, or combinations thereof, for example, via monitoring data repository 202. Application usage information may be obtained from logs (such as Internet Information Services (IIS), custom locations, the like, and combinations thereof), and configuration (such as IIS, Java, services, the like, and combinations thereof). Information such as IT enterprise architecture information and CMDB information may be obtained by comparing similarity between server usage to locate peers.

Figure 3:
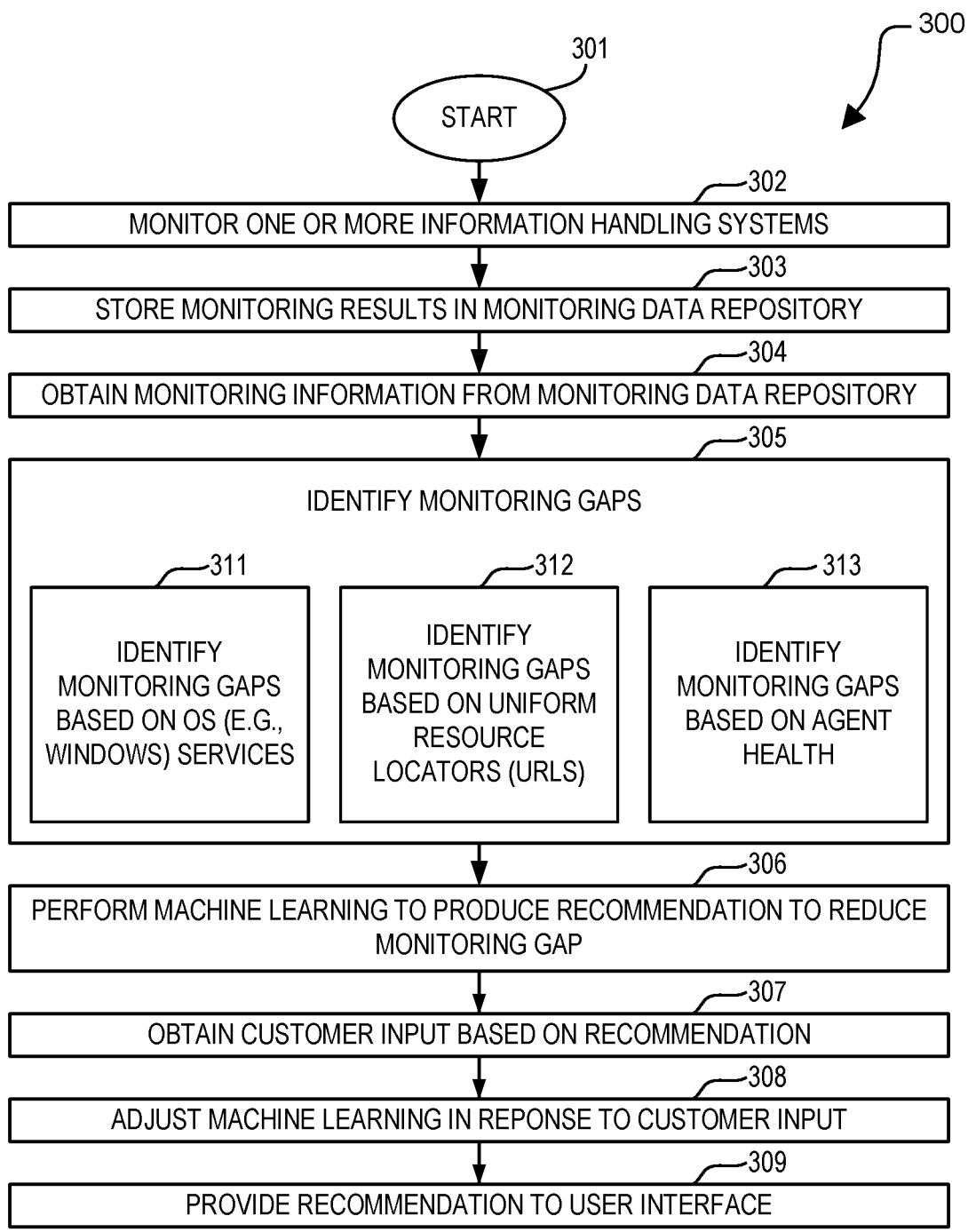
FIG. 3 is a flow diagram illustrating a method for detecting a monitoring gap for an information handling system according to an embodiment of the present disclosure.

FIG. 3 shows a method for detecting a monitoring gap for an information handling system according to an embodiment of the present disclosure. Method 300 begins at block 301 and continues to block 302. At block 302, a plurality of monitoring tools monitor one or more information handling systems. From block 302, method 300 continues to block 303. At block 303, a monitoring data repository receives monitoring results from the plurality of monitoring tools and stores the monitoring results in the monitoring data repository. From block 303, method 300 continues to block 304. At block 304, an analysis block of a monitoring gap detection subsystem obtains monitoring information from the monitoring data repository.

From block 304, method 300 continues to block 305. At block 305, the analysis block of the monitoring gap detection subsystem identifies monitoring gaps not covered by the monitoring tools. Within block 305, at block 311, an operating system (such as Windows) service gap analyzer identifies monitoring gaps based on OS (such as Windows) services. Within block 305, at block 312, a URL gap analyzer identifies monitoring gaps based on uniform resource locators (URLs). Within block 305, at block 313, an agent health gap analyzer identifies monitoring gaps based on agent health. The analyzers of analysis block provide their monitoring gap results to a machine learning (ML) recommender.

From block 305, method 300 continues to block 306. At block 306, the ML recommender performs machine learning to produce a recommendation to reduce any monitoring gap identified by the analyzers of the analysis block, and the ML recommender provides the recommendation to a customer-input-based arbitrator. From block 306, method 300 continues to block 307. At block 307, the customer-input-based arbitrator obtains customer input based on the recommendation of the ML recommender and provides the customer input to at least one of the analysis block and the ML recommender. From block 307, method 300 continues to block 308. At block 308, the ML recommender adjusts its machine learning in response to the customer input.

In accordance with at least one embodiment, the analysis block can adjust its operation in response to customer input. Such adjustment can be used to adjust the machine learning of the ML recommender in response to customer input. From block 308, method 300 continues to block 309. At block 309, ML recommender provides a recommendation to a user interface.

In accordance with at least one embodiment, configurations of a plurality of monitoring tools can be assessed in a unified and automated manner. Through the use of machine learning, an apparatus and method in accordance with at least one embodiment can learn how an application behaves and can recommend custom monitoring tools and configurations. Those recommendations can include suggesting use of new URL monitoring tools, suggesting use of important service monitoring tools, and configurating those and existing tools. Customer input can be received to obtain feedback on how relevant a detected monitoring gap is to a customer. Operation can be modified on a per-customer basis or across many customers to improve the performance of the monitoring gap detection system. If a monitoring gap is confirmed to be valid, the creation of a monitoring solution using proper configuration of an appropriate monitoring tool can be triggered.

In accordance with at least one embodiment, a technological improvement is provided by enabling unified and automated monitoring of one or more IHSs (such as servers), including monitoring of applications executed on those one or more IHSs. As an example, in the context of baseline monitoring, all IT-supported applications can be properly monitored. As another example, in the context of custom monitoring, monitoring coverage can be provided for new applications and their components. As a further example, periodic audits can be performed in a unified and automated manner. As yet another example, automatic remediation of monitoring gaps can be provided. As a further example, automated detection and remediation of monitoring gaps can provide faster resolution (such as 3.6 times faster in at least one instance). At least one embodiment can reduce issues in production by ensuring appropriate monitoring is in place. At least one embodiment can help to create appropriate monitoring when new servers are provisioned.

In accordance with at least one embodiment, a method comprises obtaining, at a monitoring gap detection subsystem, monitoring results from a monitoring data repository; analyzing, at the monitoring gap detection subsystem, the monitoring results to identify at least one monitoring gap; providing, at the monitoring gap detection subsystem, a monitoring gap result identifying the at least one monitoring gap to a machine learning recommender; performing, at the monitoring gap detection subsystem, machine learning to produce a recommendation to reduce the monitoring gap; and providing the recommendation at a user interface. In accordance with at least one embodiment, the providing the recommendation at the user interface comprises displaying the recommendation on a display screen. In accordance with at least one embodiment, the method further comprises obtaining, at the monitoring gap detection subsystem, customer input based on the recommendation; and adjusting, at the monitoring gap detection subsystem, the machine learning in response to the customer input. In accordance with at least one embodiment, the analyzing, at the monitoring gap detection subsystem, the monitoring results to identify the at least one monitoring gap comprises analyzing, at an operating system service gap analyzer, the monitoring results to identify an operating system service monitoring gap. In accordance with at least one embodiment, the analyzing, at the operating system service gap analyzer, the monitoring results to identify an operating system service monitoring gap comprises using a term frequency-inverse document frequency (TF-IDF) technique to statistically analyze the monitoring results for a plurality of operating system services to identify the operating system service monitoring gap. In accordance with at least one embodiment, the analyzing, at the monitoring gap detection subsystem, the monitoring results to identify the at least one monitoring gap comprises analyzing, at a uniform resource locator (URL) gap analyzer, the monitoring results to identify a URL monitoring gap. In accordance with at least one embodiment, the analyzing, at the monitoring gap detection subsystem, the monitoring results to identify the at least one monitoring gap comprises analyzing, at an agent health gap analyzer, the monitoring results to identify an agent health monitoring gap.

In accordance with at least one embodiment, an information handling system (IHS) comprises an analysis block configured to obtain monitoring results from a monitoring data repository, to analyze the monitoring results to identify at least one monitoring gap, and to provide a monitoring gap result identifying the at least one monitoring gap; a machine learning recommender configured to receive the monitoring gap result, to perform machine learning to produce a recommendation to reduce the monitoring gap, wherein the analysis block is configured to provide the monitoring gap result to the machine learning recommender; and a user interface configured to receive the recommendation and to display the recommendation, wherein the machine learning recommender is configured to provide the recommendation to the user interface. In accordance with at least one embodiment, the user interface comprises a display screen upon which the recommendation is displayed. In accordance with at least one embodiment, the IHS further comprises a customer-input-based arbitrator configured to obtain customer input based on the recommendation and to adjust operation of the machine learning recommender in response to the customer input. In accordance with at least one embodiment, the analysis block comprises an operating system service gap analyzer configured to analyze monitoring results to identify an operating system service monitoring gap. In accordance with at least one embodiment, the operating system service gap analyzer is configured to use a term frequency-inverse document frequency (TF-IDF) technique to statistically analyze the monitoring results for a plurality of operating system services to identify the operating system service monitoring gap. In accordance with at least one embodiment, the analysis block comprises a URL gap analyzer configured to analyze the monitoring results to identify a uniform resource locator (URL) monitoring gap. In accordance with at least one embodiment, the analysis block comprises an agent health gap analyzer configured to analyze the monitoring results to identify an agent health monitoring gap.

In accordance with at least one embodiment, a method comprises obtaining, at an analysis block, monitoring results from a monitoring data repository; analyzing, at the analysis block, the monitoring results to identify at least one monitoring gap; providing, at the analysis block, a monitoring gap result identifying the at least one monitoring gap to a machine learning recommender; performing, at the machine learning recommender, machine learning to produce a recommendation to reduce the monitoring gap; and providing the recommendation at a user interface. In accordance with at least one embodiment, the providing the recommendation at the user interface comprises displaying the recommendation on a display screen. In accordance with at least one embodiment, wherein the method further comprises obtaining, at a customer-input-based arbitrator, customer input based on the recommendation; and adjusting, at the machine learning recommender, the machine learning in response to the customer input. In accordance with at least one embodiment, wherein the analyzing, at the analysis block, the monitoring results to identify the at least one monitoring gap comprises analyzing, at an operating system service gap analyzer, the monitoring results to identify an operating system service monitoring gap. In accordance with at least one embodiment, the analyzing, at the analysis block, the monitoring results to identify the at least one monitoring gap comprises analyzing, at a uniform resource locator (URL) gap analyzer, the monitoring results to identify a URL monitoring gap. In accordance with at least one embodiment, the analyzing, at the analysis block, the monitoring results to identify the at least one monitoring gap comprises analyzing, at an agent health gap analyzer, the monitoring results to identify an agent health monitoring gap.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
obtaining, at a monitoring gap detection subsystem, monitoring results from a monitoring data repository;
analyzing, at the monitoring gap detection subsystem, the monitoring results to identify at least one monitoring gap;
providing, at the monitoring gap detection subsystem, a monitoring gap result identifying the at least one monitoring gap to a machine learning recommender;
performing, at the monitoring gap detection subsystem, machine learning to produce a recommendation to reduce the monitoring gap; and
providing the recommendation at a user interface.

2. The method of claim 1, wherein the providing the recommendation at the user interface comprises displaying the recommendation on a display screen.

3. The method of claim 1, further comprising:
obtaining, at the monitoring gap detection subsystem, customer input based on the recommendation; and
adjusting, at the monitoring gap detection subsystem, the machine learning in response to the customer input.

4. The method of claim 1, wherein the analyzing, at the monitoring gap detection subsystem, the monitoring results to identify the at least one monitoring gap comprises:
analyzing, at an operating system service gap analyzer, the monitoring results to identify an operating system service monitoring gap.

5. The method of claim 4, wherein the analyzing, at the operating system service gap analyzer, the monitoring results to identify an operating system service monitoring gap comprises:
using a term frequency-inverse document frequency (TF-IDF) technique to statistically analyze the monitoring results for a plurality of operating system services to identify the operating system service monitoring gap.

6. The method of claim 4, wherein the analyzing, at the monitoring gap detection subsystem, the monitoring results to identify the at least one monitoring gap comprises:
analyzing, at a uniform resource locator (URL) gap analyzer, the monitoring results to identify a URL monitoring gap.

7. The method of claim 6, wherein the analyzing, at the monitoring gap detection subsystem, the monitoring results to identify the at least one monitoring gap comprises:
analyzing, at an agent health gap analyzer, the monitoring results to identify an agent health monitoring gap.

8. An information handling system (IHS) comprising:
an analysis block configured to obtain monitoring results from a monitoring data repository, to analyze the monitoring results to identify at least one monitoring gap, and to provide a monitoring gap result identifying the at least one monitoring gap;
a machine learning recommender configured to receive the monitoring gap result, and to produce a recommendation to reduce the monitoring gap, wherein the analysis block is configured to provide the monitoring gap result to the machine learning recommender; and
a user interface configured to display the recommendation, wherein the machine learning recommender is configured to provide the recommendation to the user interface.

9. The IHS of claim 8, wherein the user interface comprises:
a display screen upon which the recommendation is displayed.

10. The IHS of claim 8 further comprising:
a customer-input-based arbitrator configured to obtain customer input based on the recommendation and to adjust operation of the machine learning recommender in response to the customer input.

11. The IHS of claim 8, wherein the analysis block comprises an operating system service gap analyzer configured to analyze monitoring results to identify an operating system service monitoring gap.

12. The IHS of claim 11, wherein the operating system service gap analyzer is configured to use a term frequency-inverse document frequency (TF-IDF) technique to statistically analyze the monitoring results for a plurality of operating system services to identify the operating system service monitoring gap.

13. The IHS of claim 11, wherein the analysis block comprises a URL gap analyzer configured to analyze the monitoring results to identify a uniform resource locator (URL) monitoring gap.

14. The IHS of claim 13, wherein the analysis block comprises an agent health gap analyzer configured to analyze the monitoring results to identify an agent health monitoring gap.

15. A method comprising:
obtaining, at an analysis block, monitoring results from a monitoring data repository;
analyzing, at the analysis block, the monitoring results to identify at least one monitoring gap;
providing, at the analysis block, a monitoring gap result identifying the at least one monitoring gap to a machine learning recommender;
performing, at the machine learning recommender, machine learning to produce a recommendation to reduce the monitoring gap; and
providing the recommendation at a user interface.

16. The method of claim 15, wherein the providing the recommendation at the user interface comprises displaying the recommendation on a display screen.

17. The method of claim 15, further comprising:
obtaining, at a customer-input-based arbitrator, customer input based on the recommendation; and
adjusting, at the machine learning recommender, the machine learning in response to the customer input.

18. The method of claim 15, wherein the analyzing, at the analysis block, the monitoring results to identify the at least one monitoring gap comprises:
analyzing, at an operating system service gap analyzer, the monitoring results to identify an operating system service monitoring gap.

19. The method of claim 18, wherein the analyzing, at the analysis block, the monitoring results to identify the at least one monitoring gap comprises:
analyzing, at a uniform resource locator (URL) gap analyzer, the monitoring results to identify a URL monitoring gap.

20. The method of claim 19, wherein the analyzing, at the analysis block, the monitoring results to identify the at least one monitoring gap comprises:
analyzing, at an agent health gap analyzer, the monitoring results to identify an agent health monitoring gap.

* * * * *